United States Patent
Anderson et al.

(10) Patent No.: US 10,179,654 B2
(45) Date of Patent: Jan. 15, 2019

(54) ARCHITECTURE FOR AIR DATA PROBE POWER SUPPLY CONTROL

(71) Applicant: Honeywell International Inc., Morris Plains, NJ (US)

(72) Inventors: Morris G. Anderson, Mesa, AZ (US); James B. Cox, Glendale, AZ (US); Jason Garde, Anthem, AZ (US); Grant A. Gordon, Peoria, AZ (US); Danny Thomas Kimmel, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 513 days.

(21) Appl. No.: 14/887,925

(22) Filed: Oct. 20, 2015

(65) Prior Publication Data
US 2017/0106993 A1    Apr. 20, 2017

(51) Int. Cl.
*B64D 43/02* (2006.01)
*B64D 15/12* (2006.01)
(Continued)

(52) U.S. Cl.
CPC ............ *B64D 43/02* (2013.01); *B64D 15/12* (2013.01); *G01P 5/165* (2013.01); *G01P 13/025* (2013.01);
(Continued)

(58) Field of Classification Search
CPC .... B64D 43/02; B64D 15/12; B64D 2221/00; G01P 5/165; G01P 13/025; H05B 3/56; H05B 2203/02; H05B 2214/02
See application file for complete search history.

(56) References Cited

U.S. PATENT DOCUMENTS

| 1,767,249 A | 6/1930 | Leckie et al. |
| 2,221,547 A | 11/1940 | Kollsman |

(Continued)

FOREIGN PATENT DOCUMENTS

| EP | 0556765 | 2/1993 |
| EP | 1204012 | 5/2002 |

(Continued)

OTHER PUBLICATIONS

European Patent Office, "Communication Pursuant to Article 94(3) for EP Application No. 16194057.2", Foreign Counterpart to U.S. Appl. No. 14/887,925, dated Sep. 8, 2017, pp. 15, Published in: EP.

(Continued)

*Primary Examiner* — Shawntina Fuqua
(74) *Attorney, Agent, or Firm* — Fogg & Powers LLC

(57) ABSTRACT

A system for power management of air data probes is provided. The system comprises a power source in an aircraft, and two or more air data probes electrically connected to the power source. Each of the air data probes comprises a body structure coupled to a fuselage of the aircraft, and at least one electrical heater coupled to the body structure and in electrical communication with the power source. A switching mechanism is coupled between the power source and the electrical heater of each of the air data probes. The switching mechanism is controllable such that the electrical heater of each of the air data probes is electrically connectable to the power source in parallel or in series.

18 Claims, 2 Drawing Sheets

(51) Int. Cl.
*H05B 3/56* (2006.01)
*G01P 5/165* (2006.01)
*G01P 13/02* (2006.01)

(52) U.S. Cl.
CPC .......... *H05B 3/56* (2013.01); *B64D 2221/00* (2013.01); *H05B 2203/02* (2013.01); *H05B 2214/02* (2013.01)

(56) References Cited

U.S. PATENT DOCUMENTS

| | | | |
|---|---|---|---|
| 4,458,137 A * | 7/1984 | Kirkpatrick | G01P 5/165 219/201 |
| 4,908,496 A | 3/1990 | Higgins | |
| 5,464,965 A | 11/1995 | McGregor et al. | |
| 6,414,282 B1 | 7/2002 | Ice et al. | |
| 6,668,640 B1 | 12/2003 | Alwin et al. | |
| 8,620,495 B2 | 12/2013 | Alwin et al. | |
| 2004/0217106 A1 | 11/2004 | Giterman | |
| 2005/0109763 A1 | 5/2005 | Lee et al. | |
| 2007/0142980 A1 | 6/2007 | Ausman et al. | |
| 2014/0245830 A1 | 9/2014 | Martin et al. | |

FOREIGN PATENT DOCUMENTS

| | | |
|---|---|---|
| FR | 865601 | 5/1941 |
| JP | 886455 | 2/1996 |

OTHER PUBLICATIONS

"Bombardier Challenger 605—Ice & Rain Protection", Oct. 2015, pp. 1-16, Publisher: http://www.smartcockpit.com/docs/CL605-ICE_and_RAIN_PROTECTION.pdf, Published in: US.
European Patent Office, "Extended European Search Report from EP Application No. 16194057.2 dated Jan. 2, 2017", from Foreign Counterpart of U.S. Appl. No. 14/887,925, dated Jan. 2, 2017, pp. 1-8, Published in: EP.
European Patent Office, "Communication Pursuant to Article 94(3) for EP Application No. 16194057.2", Foreign Counterpart to U.S. Appl. No. 14/887,925, dated Feb. 19, 2018, pp. 1-6, Published in: EP.

\* cited by examiner

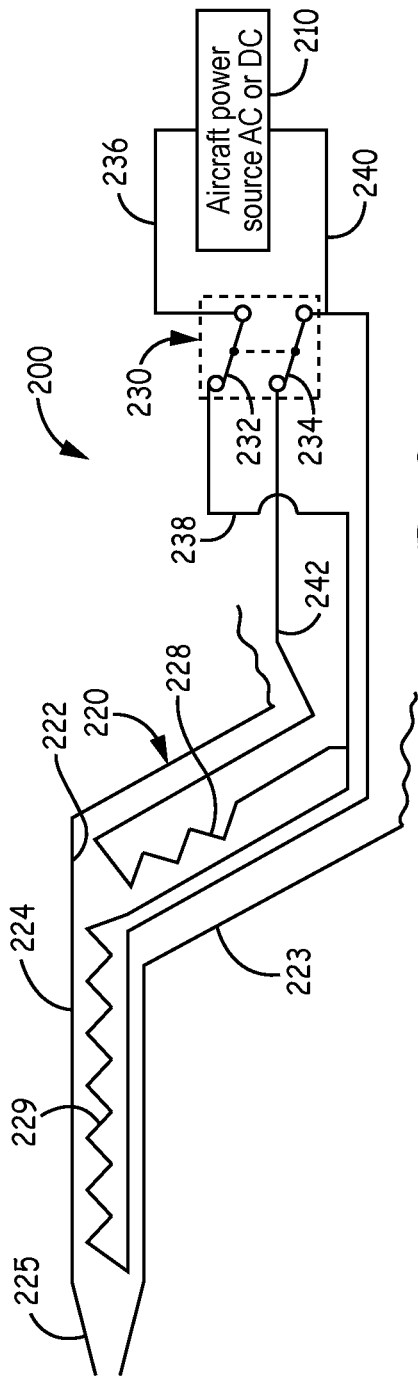
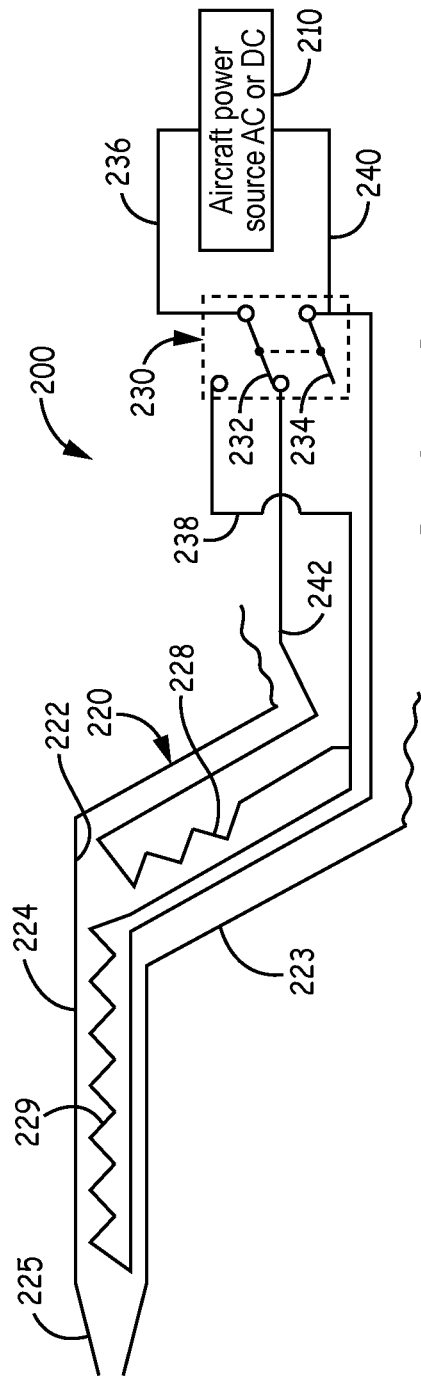
FIG. 2A
FIG. 2B

ARCHITECTURE FOR AIR DATA PROBE POWER SUPPLY CONTROL

BACKGROUND

Electrical heaters are commonly used in air data probes for aircraft to protect against icing conditions. The heater in an air data probe is typically designed to provide for de-icing of the air data probe before flight of an aircraft, and de-icing or anti-icing of the air data probe during flight.

Current governmental icing regulations now require air data probes to be exposed to significantly more demanding icing conditions than in the past. More heat can be used to protect against these conditions. However, the amount of power that can be applied to an air data probe is limited by how hot it will get while energized with the aircraft on the ground on a hot day. In addition, reliability issues have typically limited active power management techniques to reduce air data probe temperatures when the aircraft is on the ground.

Typically, each air data probe in an aircraft is connected individually to the aircraft power system, which can result in very hot conditions when operating the air data probe while the aircraft is parked or taxiing to a runway. This is true, even when using a positive temperature coefficient of resistance material for the probe heater. The increased icing threat defined in the icing regulations compounds this problem.

SUMMARY

A system for power management of air data probes is provided. The system comprises a power source in an aircraft, and two or more air data probes electrically connected to the power source. Each of the air data probes comprises a body structure coupled to a fuselage of the aircraft, and at least one electrical heater coupled to the body structure and in electrical communication with the power source. A switching mechanism is coupled between the power source and the electrical heater of each of the air data probes. The switching mechanism is controllable such that the electrical heater of each of the air data probes is electrically connectable to the power source in parallel or in series.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A and 2B are schematic diagrams of a power management system for a single air data probe, according to another embodiment.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A power supply control architecture for air data probes is provided, which reduces power demand and probe temperatures while an aircraft is on the ground. In one embodiment, two or more air data probes are connected in series in an aircraft power source while the aircraft is on the ground. An electrical switch is used to change this to a parallel connection for in-flight operation. Connecting the air data probes in series while the aircraft is on the ground provides each of the individual probe heaters with a fraction of the voltage received during in-flight operation, when the air data probes are connected in parallel to the aircraft power source.

In another embodiment, a single air data probe has multiple probe heaters that are connected in series to an aircraft power source while the aircraft is on the ground. An electrical switch is used to change this to a parallel connection for the probe heaters during in-flight operation. Connecting the probe heaters in series while the aircraft is on the ground provides each of the individual probe heaters with a fraction of the voltage received during in-flight operation.

Various types of air data probes can be implemented with the present power supply control architecture. Examples of such air data probes include pitot probes, pitot-static probes, total air temperature (TAT) probes, angle of attack (AOA) vanes, and static ports.

The present approach makes it possible to supply the power necessary for icing protection of air data probes during flight of an aircraft, without overheating the air data probes while the aircraft is on the ground.

Further details of various embodiments are described hereafter with reference to the drawings. While the drawings illustrate pitot type probes, it should be understand that other types of air data probes can implement similar power supply architectures to achieve the same results.

Figure 1A:
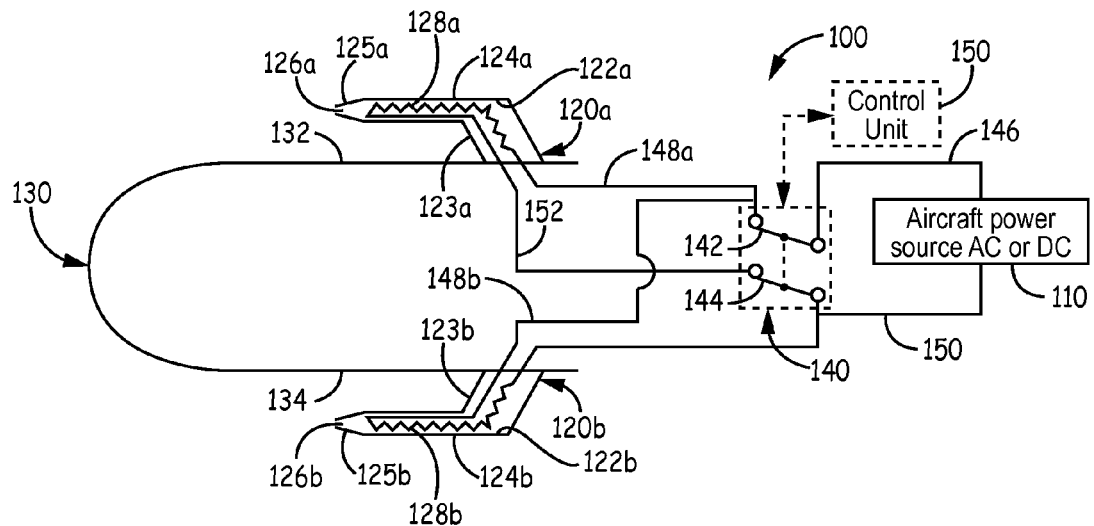
FIGS. 1A and 1B are schematic diagrams of a power management system for multiple air data probes, according to one embodiment.
Figure 1B:
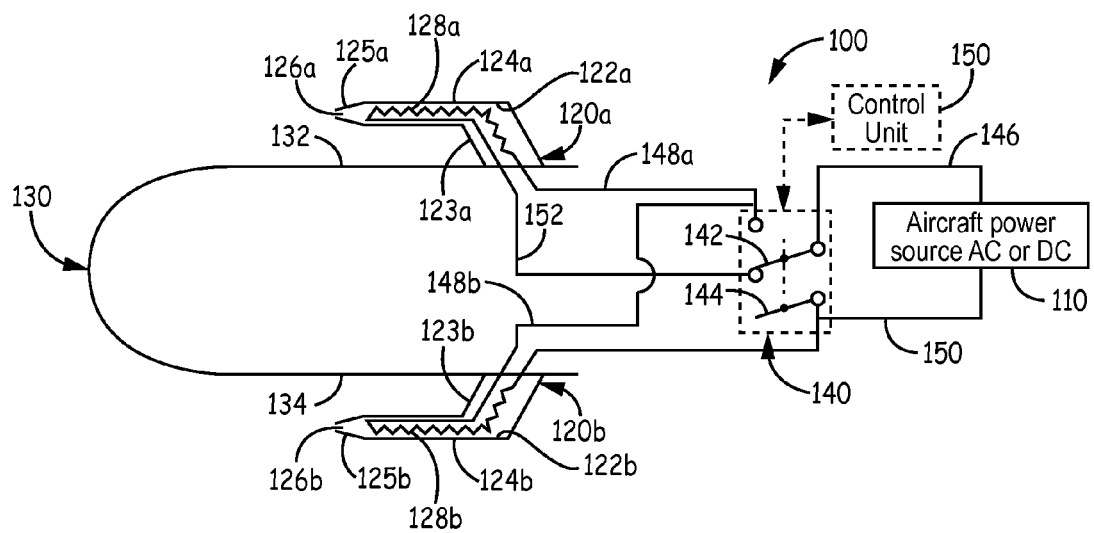

FIGS. 1A and 1B illustrate a power management system 100 for multiple air data probes, according to one embodiment. The power management system 100 generally includes an aircraft power source 110 in electrical communication with two or more air data probes 120a, 120b, which are coupled to an aircraft fuselage 130. The power source 110 can be an alternating current (AC) or direct current (DC) power source. A switching mechanism 140 is coupled between power source 110 and air data probes 120a, 120b. The switching mechanism 140 is controllable such that air data probes 120a, 120b are electrically connected to power source 110 in parallel or in series.

In one embodiment, air data probe 120a is located on a first side 132 of aircraft fuselage 130 and air data probe 120b is located on an opposite second side 134 of aircraft fuselage 130. Each of air data probes 120a, 120b includes essentially the same components. For example, air data probe 120a has a hollow body structure 122a that includes a probe strut 123a, a probe body 124a, and a probe tip 125a. The probe strut 123a is attached to first side 132 of aircraft fuselage 130. The probe tip 125a has an opening 126a that allows outside air to pass from probe tip 125a into probe body 124a. At least one electrical heater 128a is coupled to body structure 122a and is in electrical communication with power source 110.

Likewise, air data probe 120b has a hollow body structure 122b that includes a probe strut 123b, a probe body 124b, and a probe tip 125b. The probe strut 123b is attached to second side 134 of aircraft fuselage 130. The probe tip 125b has an opening 126b that allows outside air to pass from probe tip 125b into probe body 124b. At least one electrical heater 128b is coupled to body structure 122b and is also in electrical communication with power source 110. The heaters 128a, 128b are configured to provide sufficient heat to remove ice from air data probes 120a, 120b prior to flight, and to de-ice and prevent ice formation on air data probes 120a, 120b during flight.

In one embodiment, heaters 128a, 128b can comprise helical coil heater cables. Such heater cables are constructed of a heat conducting material, such as one or more metals or alloys. One or more of the heater cables can include a positive temperature coefficient resistance material, such as nickel. Alternatively, one or more of the heater cables can include a material having a resistance that is substantially independent of temperature, such as nichrome.

The heaters 128a, 128b can be respectively coupled to body structures 122a, 122b at a plurality of brazed or soldered joints. For example, in one embodiment, one more of the heater cables can be coupled by brazing or soldering to an inner surface of the body structures. In another embodiment, one or more of the heater cables can be coupled by brazing or soldering to outer surfaces of the body structures. In an alternative embodiment, one or more of the heater cables can be coupled by brazing or casting the heater cables between inner and outer surfaces of the body structures.

While FIGS. 1A and 1B show two air data probes, it should be understood that additional air data probes can be used in various implementations, with such additional air data probes electrically connectable to the power source in parallel or in series.

The switching mechanism 140 allows the heaters in each of the air data probes to be electrically connected to power source 110 in parallel when the aircraft is in flight, as shown in FIG. 1A. The switching mechanism 140 also allows the heaters in each of the air data probes to be electrically connected to power source 110 in series when the aircraft is on the ground, as shown in FIG. 1B.

In one embodiment, switching mechanism 140 includes a pair of switches 142 and 144, which are in electrical communication with power source 110 and allow for switching between parallel and series connections to heaters 128a and 128b. For example, as shown in FIG. 1A, heaters 128a and 128b are electrically connected in parallel with power source 110 when switches 142 and 144 are in a first position. In this configuration, switch 142 connects a first output power line 146 from power source 110 with a set of feed lines 148a and 148b respectively coupled to heaters 128a and 128b. The switch 144 connects a second output power line 150 from power source 110 with a feed line 152 coupled to heater 128a. The output power line 150 is also directly connected to heater 128b. The configuration of switches 142 and 144 in FIG. 1A is used during flight of the aircraft.

As shown in FIG. 1B, heaters 128a and 128b are electrically connected in series with power source 110 when switches 142 and 144 are moved to a second position. In this configuration, switch 142 connects output power line 146 with feed line 152 that is coupled to heater 128a. The switch 144 is open so that output power from line 150 is only directed to heater 128b. The configuration of switches 142 and 144 in FIG. 1B is used when the aircraft is on the ground.

The switching mechanism 140 can be activated and controlled in various conventional ways onboard the aircraft. For example, the switching mechanism can be activated by an indication of weight on wheels of the aircraft. The switching mechanism can also be activated by commands sent from the cockpit of the aircraft. The switching mechanism can also be activated by an indication of airspeed around the aircraft. Alternatively, the switching mechanism can be activated by commands from an air data system computer or hosted air data software.

In another embodiment, a control unit 150 can be operatively coupled to the switching mechanism. For example, the switching mechanism can interface with or be within an air data heater control unit, a probe heat computer, or similar device that controls heater power to the air data probes. The switching mechanism can also interface with or within a remote power distribution unit or similar aircraft electrical power distribution system component.

FIGS. 2A and 2B illustrate a power management system 200 for a single air data probe, according to another embodiment. The power management system 200 generally includes an aircraft power source 210 in electrical communication an air data probe 220. The power source 210 can be an AC or DC power source. A switching mechanism 230 is coupled between power source 210 and air data probe 220. The switching mechanism 230 is controllable such that air data probe 220 is electrically connected to power source 210 in parallel or in series.

The air data probe 220 has a hollow body structure 222 that includes a probe strut 223, a probe body 224, and a probe tip 225. The probe strut 223 is configured to be attached an aircraft fuselage. The probe tip 225 has an opening 226 that allows outside air to pass from probe tip 225 into probe body 224.

A first electrical heater 228 is coupled to probe strut 223, and a second electrical heater 229 is coupled to probe body 224. The electrical heaters 228 and 229 are in electrical communication with power source 210. The heaters 228 and 229 are configured to provide sufficient heat to remove ice from air data probe 220 prior to flight of an aircraft, and to de-ice and prevent ice formation on air data probe 220 during flight.

In one embodiment, heaters 228 and 229 can comprise helical coil heater cables constructed of a heat conducting material. One or more of the heater cables can include a positive temperature coefficient resistance material. Alternatively, one or more of the heater cables can include a material having a resistance that is independent of temperature.

The heaters 228 and 229 can be respectively coupled to body structure 222 at plurality of brazed or soldered joints. For example, in one embodiment, one more of the heater cables can be coupled by brazing or soldering to an inner surface of the body structure. In another embodiment, one or more of the heater cables can be coupled by brazing or soldering to outer surfaces of the body structure. In an alternative embodiment, one or more of the heater cables can be coupled by brazing or casting the heater cables between inner and outer surfaces of the body structure.

The switching mechanism 230 allows heaters 228 and 229 to be electrically connected to power source 210 in parallel, as shown in FIG. 2A, when the aircraft is in flight. The switching mechanism 230 also allows heaters 228 and 229 to be electrically connected to power source 210 in series, as shown in FIG. 2B, when the aircraft is on the ground.

While FIGS. 2A and 2B show two heaters, it should be understood that additional heaters can be used in various implementations, with such additional heaters electrically connectable to the power source in parallel or in series.

In one embodiment, switching mechanism 230 includes a pair of switches 232 and 234, which are in electrical communication with power source 210 and allow for switching between parallel and series connections to heaters 228 and 229. For example, as shown in FIG. 2A, heaters 228 and 229 are electrically connected in parallel with power source 210 when switches 232 and 234 are in a first position. In this configuration, switch 232 connects a first output power line 236 from power source 210 with a feed line 238 connected to heaters 228 and 229. The switch 234 connects a second output power line 240 from power source 210 with a feed line 242 coupled to heater 228. The output power line 240 is also directly connected to heater 229. The configuration of switches 232 and 234 in FIG. 2A is used during flight of the aircraft.

As shown in FIG. 2B, heaters 228 and 229 are electrically connected in series with power source 210 when switches 232 and 234 are moved to a second position. In this configuration, switch 232 connects output power line 236 with feed line 242 that is coupled to heater 228. The switch 234 is open so that output power from line 240 is only directed to heater 229. The configuration of switches 232 and 234 in FIG. 2B is used when the aircraft is on the ground.

The switching mechanism 230 can be activated and controlled in various conventional ways onboard the aircraft, such as described previously with respect to the embodiment of FIGS. 1A and 1B.

Example Embodiments

Example 1 includes a system for power management of air data probes, the system comprising a power source in an aircraft, and two or more air data probes electrically connected to the power source. Each of the air data probes comprises a body structure coupled to a fuselage of the aircraft, and at least one electrical heater coupled to the body structure and in electrical communication with the power source. A switching mechanism is coupled between the power source and the electrical heater of each of the air data probes. The switching mechanism is controllable such that the electrical heater of each of the air data probes is electrically connectable to the power source in parallel or in series.

Example 2 includes the system of Example 1, wherein the switching mechanism is controllable such that the electrical heater in each of the air data probes is electrically connected to the power source in parallel when the aircraft is in flight, and electrically connected to the power source in series when the aircraft is on ground.

Example 3 includes the system of any of Examples 1-2, wherein the switching mechanism is activated by an indication of weight on wheels of the aircraft.

Example 4 includes the system of any of Examples 1-2, wherein the switching mechanism is activated by commands from a cockpit of the aircraft.

Example 5 includes the system of any of Examples 1-2, wherein the switching mechanism is activated by an indication of airspeed around the aircraft.

Example 6 includes the system of any of Examples 1-2, wherein the switching mechanism is activated by commands from an air data system computer or hosted air data software.

Example 7 includes the system of any of Examples 1-2, further comprising a control unit operatively coupled to the switching mechanism.

Example 8 includes the system of Example 7, wherein the control unit comprises an air data heater control unit, or a probe heat computer.

Example 9 includes the system of Example 7, wherein the control unit comprises a remote power distribution unit, or an aircraft electrical power distribution system component.

Example 10 includes the system of any of Examples 1-9, wherein one or more of the electrical heaters comprises a helical coil heater cable.

Example 11 includes the system of any of Examples 1-10, wherein one or more of the electrical heaters comprises a positive temperature coefficient resistance material.

Example 12 includes the system of any of Examples 1-10, wherein one or more of the electrical heaters comprises a material having a resistance that is substantially independent of temperature.

Example 13 includes an air data probe comprising: a hollow body structure that includes a probe strut, a probe body, and a probe tip, wherein the probe strut is configured to be coupled to a fuselage of an aircraft, and the probe tip has an opening that allows outside air to pass from the probe tip into the probe body; and two or more electrical heaters coupled to the body structure and configured for electrical communication with an aircraft power source. A switching mechanism is coupled to each of the electrical heaters and is configured for electrical communication with the aircraft power source. The switching mechanism is controllable such that the electrical heaters are electrically connectable to the aircraft power source in parallel or in series.

Example 14 includes the air data probe of Example 13, wherein the switching mechanism is controllable such that the electrical heaters are electrically connected to the aircraft power source in parallel when the aircraft is in flight, and electrically connected to the aircraft power source in series when the aircraft is on ground.

Example 15 includes the air data probe of any of Examples 13-14, wherein each of the electrical heaters comprises a helical coil heater cable.

Example 16 includes a method of fabricating an air data probe, the method comprising: forming a hollow body structure that includes a probe strut, a probe body, and a probe tip, wherein the probe strut is configured to be coupled to a fuselage of an aircraft, and the probe tip has an opening that allows outside air to pass from the probe tip into the probe body; coupling a plurality of electrical heaters to the body structure, the electrical heaters configured for electrical communication with an aircraft power source; and coupling a switching mechanism to the electrical heaters, the switching mechanism configured for electrical communication with the aircraft power source. The switching mechanism is controllable such that the electrical heaters are electrically connectable to the aircraft power source in parallel or in series.

Example 17 includes the method of Example 16, wherein one or more of the electrical heaters comprise a helical coil heater cable.

Example 18 includes the method of Example 17, wherein one or more of the helical coil heater cables is coupled to the body structure by brazing or soldering to an inner surface of the body structure.

Example 19 includes the method of Example 17, wherein one or more of the helical coil heater cables is coupled to the body structure by brazing or soldering to an outer surface of the body structure.

Example 20 includes the method of Example 17, wherein one or more of the helical coil heater cables is coupled to the body structure by brazing or casting the helical coil heater cable between inner and outer surfaces of the body structure.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for power management of air data probes, the system comprising:
   a power source configured to be mounted in an aircraft;
   two or more air data probes electrically connected to the power source, wherein each of the air data probes comprises:
      a body structure configured to be coupled to a fuselage of the aircraft; and
      at least one electrical heater coupled to the body structure and in electrical communication with the power source; and
   a switching mechanism coupled between the power source and the electrical heater of each of the air data probes;
   wherein the switching mechanism is controllable such that the electrical heater of each of the air data probes is electrically connectable to the power source in parallel or in series;
   wherein the switching mechanism is controllable such that the electrical heater in each of the air data probes is:
      electrically connected to the power source in parallel when the aircraft is in flight and
      electrically connected to the power source in series when the aircraft is on ground.

2. The system of claim 1, wherein the switching mechanism is activated by an indication of weight on wheels of the aircraft.

3. The system of claim 1, wherein the switching mechanism is activated by commands from a cockpit of the aircraft.

4. The system of claim 1, wherein the switching mechanism is activated by an indication of airspeed around the aircraft.

5. The system of claim 1, wherein the switching mechanism is activated by commands from an air data system computer or hosted air data software.

6. The system of claim 1, further comprising a control unit operatively coupled to the switching mechanism.

7. The system of claim 6, wherein the control unit comprises:
   an air data heater control unit; or
   a probe heat computer.

8. The system of claim 6, wherein the control unit comprises:
   a remote power distribution unit; or
   an aircraft electrical power distribution system component.

9. The system of claim 1, wherein one or more of the electrical heaters comprises a helical coil heater cable.

10. The system of claim 1, wherein one or more of the electrical heaters comprises a positive temperature coefficient resistance material.

11. The system of claim 1, wherein one or more of the electrical heaters comprises a material having a resistance that is substantially independent of temperature.

12. An air data probe, comprising:
   a hollow body structure that includes a probe strut, a probe body, and a probe tip, wherein the probe strut is configured to be coupled to a fuselage of an aircraft, and the probe tip has an opening that allows outside air to pass from the probe tip into the probe body;
   two or more electrical heaters coupled to the body structure and configured for electrical communication with an aircraft power source; and
   a switching mechanism coupled to each of the electrical heaters and configured for electrical communication with the aircraft power source;
   wherein the switching mechanism is controllable such that the electrical heaters are electrically connectable to the aircraft power source in parallel or in series;
   wherein the switching mechanism is controllable such that the electrical heaters are:
      electrically connected to the aircraft power source in parallel when the aircraft is in flight; and
      electrically connected to the aircraft power source in series when the aircraft is on ground.

13. The air data probe of claim 12, wherein each of the electrical heaters comprises a helical coil heater cable.

14. A method of fabricating an air data probe, the method comprising:
   forming a hollow body structure that includes a probe strut, a probe body, and a probe tip, wherein the probe strut is configured to be coupled to a fuselage of an aircraft, and the probe tip has an opening that allows outside air to pass from the probe tip into the probe body;
   coupling a plurality of electrical heaters to the body structure, the electrical heaters configured for electrical communication with an aircraft power source; and
   coupling a switching mechanism to the electrical heaters, the switching mechanism configured for electrical communication with the aircraft power source, wherein the switching mechanism is controllable such that the electrical heaters are electrically connectable to the aircraft power source in parallel or in series, wherein the switching mechanism is controllable such that the electrical heaters are:
      electrically connected to the aircraft power source in parallel when the aircraft is in flight; and
      electrically connected to the aircraft power source in series when the aircraft is on ground.

15. The method of claim 14, wherein one or more of the electrical heaters comprise a helical coil heater cable.

16. The method of claim 15, wherein one or more of the helical coil heater cables is coupled to the body structure by brazing or soldering to an inner surface of the body structure.

17. The method of claim 15, wherein one or more of the helical coil heater cables is coupled to the body structure by brazing or soldering to an outer surface of the body structure.

18. The method of claim 15, wherein one or more of the helical coil heater cables is coupled to the body structure by brazing or casting the helical coil heater cable between inner and outer surfaces of the body structure.

* * * * *